Dec. 20, 1960 K. E. SNYDER 2,965,120
PRESSURE CONTROL DEVICE
Filed Oct. 29, 1956
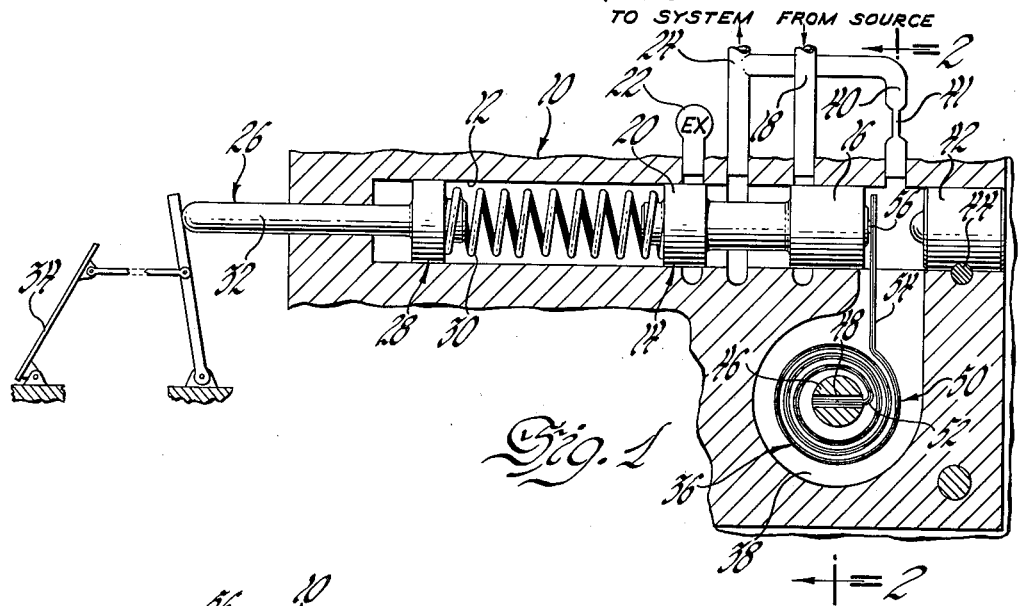
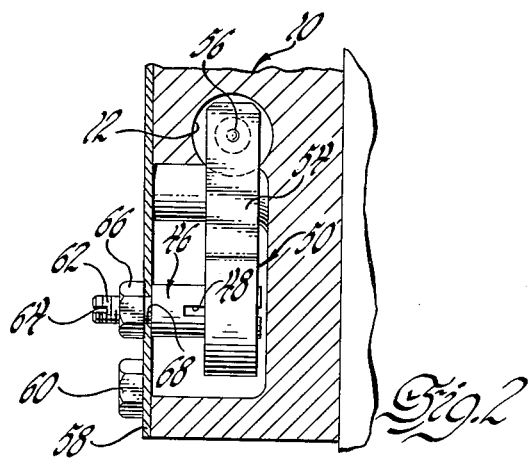
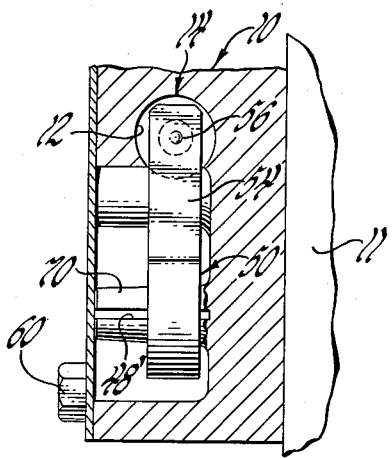
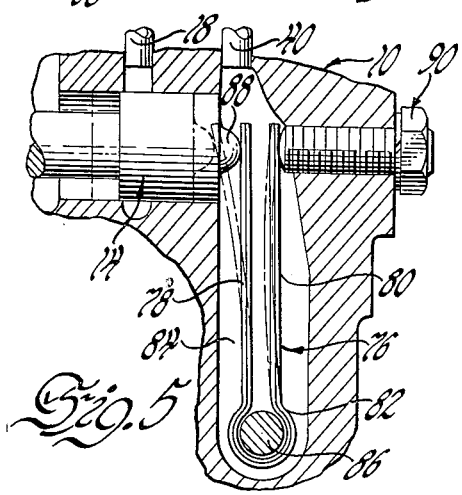
INVENTOR.
Kenneth E. Snyder
BY
W. C. Middleton
ATTORNEY.

United States Patent Office 2,965,120
Patented Dec. 20, 1960

2,965,120

PRESSURE CONTROL DEVICE

Kenneth E. Snyder, Northville, Mich., assignor to General Motors Corporation, Detroit, Mich., a corporation of Delaware Filed Oct. 29, 1956, Ser. No. 618,768

11 Claims. (Cl. 137—116.3)

This invention relates to control devices and particularly fluid pressure control devices.

Frequently in applications requiring accurate fluid pressure regulation, it is necessary to consider the viscosity variations of the pressure fluid due to temperature changes. One such application occurs in a fluid pressure controlled step ratio type automatic transmission in which changes in speed ratios, especially upshifts, vary both with throttle positions and vehicle speeds as determined usually by a governor. Generally, a shift valve is employed to control shifts in accordance with a predetermined relationship between the opposing forces from a vehicle speed conscious governor pressure and a throttle position conscious throttle pressure. At a particular speed of the vehicle, governor pressure is enough greater than throttle pressure to cause the shift valve to upshift. Accordingly, if the throttle pressure is increased, before an upshift can occur, a greater vehicle speed must be attained to provide a governor pressure capable of overcoming this increased throttle pressure. Therefore, with a wide open throttle, changes in speed ratios, i.e., shift points, occur at a considerably higher vehicle speed than with light throttle shifts increasing the ability of the vehicle to accelerate rapidly. This throttle pressure is usually developed from the coaction of an accelerator pedal and a regulator valve which pressure is utilized to oppose upshift movements of the shift valves. Hence, as the accelerator is depressed, the throttle is opened wider, throttle pressure increases and the opposition to upshift movements of the shift valves is likewise increased. When a transmission has been operating and the pressure fluid is at some normal operating temperature, which may be determined by a cooler, for a given accelerator position, an upshift will occur at some desired or predetermined point. However, when the engine and transmission are cold, significant is the increased resistance against upshifting movements of the shift valve due to greater friction between the mating valve and bore surfaces and that a cold engine requires a slightly greater throttle opening to generate a given torque than when fully warmed. The increased throttle opening will develop a greater throttle pressure which with the reluctance of the shift valves to upshift will cause all of the upshifts to occur considerably later than normally and to be accompanied by roughness and excessive engine speeds.

Heretofore, although not entirely satisfactory, various type devices have been employed to overcome this cold operation problem, such as calibrated orifices and accumulators.

With these considerations in mind, it is proposed to combine a fluid pressure regulating means with means responsive to the viscosity, as determined by temperature, of the pressure fluid to obtain pressure regulation that is uninfluenced by temperature changes of the fluid.

Further, the invention provides means for adjusting this viscosity responsive means to compensate for variations in manufacturing tolerances and changes occurring during normal usage.

A more specific purpose for the invention is the provision of a thermal element for coacting with a regulator valve to decrease the pressure of fluid developed by the valve with an increase in viscosity of the fluid.

In carrying out the invention, a pressure regulator valve is manually controlled to provide some desired pressure. A thermal element which is exposed to the pressure fluid coacts with this regulator valve to maintain this desired pressure despite changes in the viscosity of the pressure fluid. Specifically, if the fluid is cold, the thermal element will reduce the pressure slightly in proportion to the temperature of the fluid. In addition, the thermal element may be adjusted to vary its effect on the pressure regulator valve and accordingly, the pressure developed during cold operation.

It should be noted that the term "viscosity" as used herein refers to viscosity changes of a particular fluid due to temperature changes, for as is well known a given fluid is more viscous when cold than when hot.

The foregoing and other objects and advantages of the invention will be apparent from the following description and from the accompanying drawings, in which:

Figure 1 is a sectional view of a control device incorporating this invention.

Fig. 2 is a sectional view taken along lines 2—2 of Fig. 1.

Fig. 3 is a sectional view of a modification of the Fig. 2 structure.

Fig. 4 is a fragmentary view of another modification of the Fig. 2 structure.

Fig. 5 is a sectional view of a modification of the Fig. 1 structure.

In Figure 1 a control device incorporating the invention is illustrated which includes a valve body 10 suitably secured to a transmission housing or case 11 and having an elongated bore 12 therein. A pressure regulating means, as pressure regulating valve 14, is slidable in this bore and is depicted in the pressure regulating position. In this position a rear control land 16 is disposed adjacent a pressure fluid inlet passage 18 connected to a suitable source (not shown) and a front control land 20 is adjacent a relief passage 22. Pressure fluid that passes the control land 16 proceeds through an outlet passage 24 to the system.

For determining the pressure to be regulated by the regulator valve 14, a control means 26 is provided having a valve plunger 28 slidable in the bore 12 with a control spring 30 interposed between this plunger 28 and the regulator valve 14. An elongated stem 32 of the plunger 28 extends beyond the valve body 10 and engages a manually operated means, such as pivotally mounted accelerator pedal 34. Depression of the accelerator pedal will, through the control spring 30, urge the regulator valve 14 to a position in which the inlet passage 18 is opened longer by the control land 16 increasing the regulated pressure. Similarly, release of the accelerator pedal 34 will decrease the regulated pressure.

To sense changes in the viscosity of the pressure fluid, a thermal responsive means 36 is employed which includes a chamber 38 in the valve body 10 that opens into the bore 12 at the end of the regulator valve next to the control land 16. This chamber is supplied with pressure fluid from the outlet passage 24 by a branch conduit 40. The pressure fluid in chamber 38 also acts on the end of the valve 14 and urges the valve in opposition to control spring 30 to a position in which the front control land 20 tends to open the relief passage 22 decreasing the regulated pressure. Without this feature the lands 16 and 20 would have to be of different diameters to provide differential areas. In the conduit 40 an orifice 41 is furnished to reduce the sensitiveness of the regulator valve to sudden changes in pressure fluid due to sudden repositionings of the accelerator pedal 34. A plug 42 is fitted in the end of the bore 12 and retained by a pin 44 for sealing this bore opening against leakage.

As best illustrated in Figure 2, an adjustable control pin 46 having a receiving slot 48 extends into the chamber 38. A spiral shaped thermal element 50 of suitable bimetallic material has an inside end 52 which is slidably received in this receiving slot 48. An outside extension 54 of the thermal element 50 extends laterally of the pin 46 and deflects in a known manner either to the left with cold temperatures or to the right with hot temperatures. A tip 56 on the extension 54 engages the face of the regulator valve 14 next to the control land 16 and is preferably conical shaped to provide a point contact with the face of the valve allowing pressure fluid to act on the entire face area of the valve.

The adjustable control pin 46 is secured to a valve body cover 58 which in turn is attached to the valve body 10 by bolts 60. A threaded reduced diameter end 62 of the pin has a slot 64 adapted to receive an adjusting tool, e.g., a screw driver, which tool rotates the pin and the thermal element 50 until the desired bias is applied to the valve 14 by the extension 54. Then a lock nut 66, threadedly engaging the end 62, is tightened to clampingly retain a shoulder 68 on the pin against the cover 58.

In operation, assuming the accelerator pedal 34 is depressed and remains stationary in its new position, the valve plunger 28 will move the regulator valve 14 by means of the spring 30 so that the inlet passage 18 is opened by the land 16. Pressure fluid in the inlet passage 18 then proceeds past the land 16 of the regulator valve 14 and continues to the system through outlet passage 24 and to the chamber 38 and the face of the valve 14 via conduit 40. As soon as the pressure fluid in the conduit 40 acts on the face of the valve, the spring 30 will be compressed until the inlet passage 18 is closed. If the pressure on the face of valve 14 is great enough, the relief passage 22 will be opened by the control land 20. Otherwise, both passages 18 and 22 will remain closed until the pressure drops and the passage 18 is reopened. This cycle is continuous during regulation and the pressure developed is determined by the opposing forces from the control spring 30 and the bias from the deflection of extension 54 of the thermal element 50. If the fluid is cold then the leftward bias from the thermal element 50 will be increased reducing the regulated pressure. As the fluid warms up, this leftward bias will be decreased and the pressure will gradually increase to the desired value. Otherwise, since a cold engine requires a greater throttle opening to produce a certain torque, the pressure would be greater than desired.

When the accelerator pedal 34 is further depressed, the biasing force from the control spring 30 will urge the regulator valve to a position in which the inlet passage 18 is opened somewhat longer by the control land 16, consequently an increased throttle pressure will be developed. During this movement of the accelerator pedal, the operation of the thermal element 50 will be the same as described. Preferably, after the fluid has reached some desired operating temperature, the extension 54 should move out of engagement with the end of the valve 14 permitting free operation.

In the Figure 3 modification an upstanding post 70 integral with the valve body 10 has a receiving slot 48' for the inside end 52 of the thermal element 50. With this arrangement, the position of the slot 48' relative to the bore must be accurate since no adjustment is provided. However, this modification is advantageous since the post 70 is made integral with the body and fewer parts are required.

The Figure 4 modification utilizes an upstanding post 70' integral with the valve body and having a relatively accurate outside diameter instead of a slot. This outside diameter is made greater than the inside diameter of an inside loop 71 of a thermal element 50' to furnish a frictional engagement between the post 70' and the loop 71. When it is desired to remove the thermal element 50' or adjust its position, a suitable tool can be inserted between opposite flanges 72 and 74 and the thermal element 50' is rotated.

In Figure 5, a bimetallic thermal element 76 of hairpin type configuration is employed instead of the thermal element 50 in Figure 1. Thermal element 76 has two parallel legs 78 and 80 which form at the bottom end a loop 82. When thermal element 76 is installed in a chamber 84 similar to the Figure 1 chamber 38, the loop 82 slidably engages a stud 86 which stud may be integral with the valve body 10 or attached thereto. In the installed position, leg 78 abuts a conical end 88 of the valve 14 and leg 80 engages an adjusting nut and screw 90 in the valve body 10. By moving the nut and screw 90 in and out of the body 10 the biasing effect from the thermal element on the regulator valve 14 can be easily altered. Operationally, this modification functions substantially the same as in Figure 1 with the thermal element 76 being movable from the solid line position to the dotted line position.

From the foregoing it is apparent that this regulator valve being influenced by temperature changes compensates for changes in throttle settings required with a cold engine to provide the proper pressure, which can be utilized in the control system for opposing upshift movement of shift valves. Since the effect of temperature changes is utilized as such to vary regulated pressures for a given throttle opening, the transmission will always upshift at the same point. Also, the thermal element can be conveniently adjusted with a pressure gage and with fluid at the proper temperature during assembly to provide a desired regulated pressure at some predetermined temperature of the fluid.

I claim:

1. A control device for regulating pressure fluid comprising, in combination, valve means for regulating the pressure fluid, manually operated control means for establishing a pressure at which said valve means is to regulate, thermal responsive means arranged and constructed to exert on the valve means a bias for decreasing the pressure established by said control means with changes in viscosity of the fluid due to temperature decreases, and means for adjusting said thermal responsive means.

2. Regulating valve structure for pressure fluid comprising, in combination, a valve body having a bore therein and including spaced inlet, outlet and relief passages opening into said bore, a regulator valve movable in said bore between said inlet and relief passages to regulate pressure fluid in said outlet passage, control means for establishing pressures to be regulated by said regulator valve, and a temperature responsive element arranged to exert a bias on said regulator valve so as to reduce pressures established by said valve with changes in viscosity of the pressure fluid due to temperature decreases.

3. Regulating valve structure for pressure fluid comprising, in combination, a valve body having a bore therein and including spaced inlet, outlet and relief passages opening into said bore and a chamber connected to one of said passages a regulator valve movable in said bore between said inlet and relief passages to regulate pressure fluid in said outlet passage, control means coacting with said regulator valve for establishing pressures to be regulated by said regulator valve and a thermal element disposed in said chamber for exerting a bias on said valve that varies with the temperature of the pressure fluid so as to decrease the pressure of fluid regulated by said valve when the pressure fluid has a high viscosity due to a decrease in temperature.

4. Regulating valve structure for pressure fluid comprising, in combination, a valve body having a bore therein and including spaced inlet, outlet and relief passages opening into said bore and a chamber connected to one of said passages, a regulator valve movable in said bore between said inlet and relief passages to regulate pressure fluid in said outlet passage, control means coacting with said regulator valve for establishing pressures to be regulated by said regulator valve, a thermal element disposed in said chamber for exerting a bias on said valve that varies with the temperature of the pressure fluid so as to decrease the pressure of fluid regulated by said valve when the pressure fluid has a high viscosity due to a decrease in temperature, and means for adjusting said thermal element.

5. Regulating valve structure for pressure fluid comprising, in combination, a valve body having a bore therein and including spaced inlet, outlet and relief passages opening into said bore and a chamber connected to one of said passages, a regulator valve movable in said bore between said inlet and relief passages to regulate pressure fluid in said outlet passage, manually operated control means for establishing pressures to be regulated by said regulator valve, a thermal element disposed in said chamber for exerting a bias on said valve that varies with the temperature of the pressure fluid so as to decrease the pressure of fluid regulated by said valve when the pressure fluid has a high viscosity due to a decrease in temperature, and means for adjusting said thermal element.

6. Regulating valve structure for pressure fluid comprising, in combination, a valve body having a bore therein and including spaced inlet, outlet and relief passages opening into said bore and a chamber connected to one of said passages, a regulator valve movable in said bore between said inlet and relief passages to regulate pressure fluid in said outlet passage, a manually operated valve plunger slidable in said bore and coacting with said regulator valve for establishing pressures to be regulated by said regulator valve, a thermal element disposed in said chamber for exerting a bias on the end of said regulator valve opposite said valve plunger so as to reduce pressures regulated by said valve an amount corresponding to increases in viscosity of the pressure fluid due to decreases in the temperature thereof.

7. Regulating valve structure for pressure fluid comprising, in combination, a valve body having a bore therein and including spaced inlet, outlet and relief passages opening into said bore and a chamber connected to one of said passages, a regulator valve movable in said bore between said inlet and relief passages to regulate pressure fluid in said outlet passage, a manually operated valve plunger slidable in said bore, a resilient member interposed between said plunger and said regulator valve, said valve plunger and said resilient member coacting with said regulator valve for establishing pressures to be regulated by said regulator valve, a thermal element disposed in said chamber for exerting a bias on the end of said regulator valve opposite said valve plunger so as to reduce pressures regulated by said valve an amount corresponding to increases in viscosity of the pressure fluid due to decreases in the temperature thereof, and means for adjusting said thermal element to vary the relative positions of said valve and said thermal element.

8. Regulating valve structure for pressure fluid comprising, in combination, a valve body having a bore therein and including spaced inlet, outlet and relief passages opening into said bore and a chamber connected to one of said passages, a regulator valve movable in said bore between said inlet and relief passages to regulate pressure fluid in said outlet passage, a manually operated valve plunger slidable in said bore and coacting with said regulator valve for establishing pressures to be regulated by said regulator valve, a hairpin type thermal element disposed in said chamber and having a pair of legs with one leg exerting a bias on the end of said regulator valve opposite said valve plunger so as to reduce pressures regulated by said valve an amount corresponding to increases in viscosity of the pressure fluid due to decreases in the temperature thereof, and means coacting with the other of said pair of legs for adjusting said thermal element.

9. Regulating valve structure for pressure fluid comprising, in combination, a valve body having a bore therein and including spaced inlet, outlet, and relief passages opening into said bore, a regulator valve movable in said bore between said inlet and relief passages to regulate pressure fluid in said outlet passage, a manually operated valve plunger slidable in said bore, a resilient member interposed between said plunger and said regulator valve, said valve plunger and said resilient member coacting with said regulator valve for establishing pressures to be regulated by said regulator valve, a chamber in said body opening into said bore adjacent the end of said valve and opposite said plunger, a conduit interconnecting said outlet passage and said chamber, a spiral shaped thermal element mounted in said chamber and including an arm exerting a bias on the end of said valve so as to reduce pressures regulated by said valve an amount proportional to increases in viscosity of the pressure fluid due to decreases in the temperature thereof, and means for adjusting said thermal element to vary the relative positions of said valve and said arm.

10. In a control system for a transmission driven by a throttle controlled engine, the combination of, a valve body having a bore therein and including spaced inlet, outlet, and relief passages opening into said bore, a regulator valve movable in said bore between said inlet and relief passages to regulate pressure fluid in said outlet passage, a throttle operated valve plunger slidable in said bore, a resilient member interposed between said plunger and said regulator valve, said valve plunger and said resilient member coacting with said regulator valve for establishing pressures to be regulated by said regulator valve, a chamber in said body opening into said bore adjacent the end of said valve opposite said plunger, a conduit interconnecting said outlet passage and said chamber, a thermal element mounted in said chamber and including an extension exerting a bias on the end of said regulator valve so as to reduce pressures regulated by said valve an amount corresponding to increases in viscosity of the pressure fluid due to decreases in the temperature thereof, and means for adjusting said thermal element to vary the bias exerted thereby.

11. In a control system for a transmission driven by a throttle controlled engine, the combination of regulator valve means for regulating fluid pressure, throttle operated control means for establishing pressures to be regulated by the regulator valve means, and thermal responsive means for decreasing the pressure established by the throttle operated control means with changes in viscosity of the fluid due to temperature decreases.

References Cited in the file of this patent

UNITED STATES PATENTS

| | | |
|---|---|---|
| 1,480,909 | Johnson | Jan. 15, 1924 |
| 1,566,995 | Standerwick | Dec. 22, 1925 |
| 1,776,938 | Turner | Sept. 30, 1930 |
| 1,813,122 | Moore | July 7, 1931 |
| 1,876,552 | Beecher | Sept. 13, 1932 |
| 1,996,330 | Goshaw | Apr. 2, 1935 |
| 2,109,202 | Raney | Feb. 22, 1938 |
| 2,276,371 | Gooper et al. | Mar. 17, 1942 |
| 2,590,112 | MacCracken | Mar. 25, 1952 |
| 2,726,557 | Ackerman | Dec. 13, 1955 |
| 2,733,732 | Baker | Feb. 7, 1956 |